US009695901B2

(12) United States Patent
Leonard

(10) Patent No.: US 9,695,901 B2
(45) Date of Patent: Jul. 4, 2017

(54) GAS SPRING SYSTEM

(71) Applicant: FIRESTONE INDUSTRIAL PRODUCTS COMPANY, LLC, Indianapolis, IN (US)

(72) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/958,431

(22) Filed: Dec. 3, 2015

(65) Prior Publication Data

US 2016/0108986 A1 Apr. 21, 2016

Related U.S. Application Data

(63) Continuation of application No. PCT/US2014/046177, filed on Jul. 10, 2014.

(Continued)

(51) Int. Cl.

| | |
|---|---|
| ***F16F 9/05*** | (2006.01) |
| ***F16F 13/00*** | (2006.01) |
| ***F16F 9/38*** | (2006.01) |
| ***B60G 15/12*** | (2006.01) |

(Continued)

(52) U.S. Cl.

CPC ............ *F16F 13/002* (2013.01); *B60G 15/12* (2013.01); *B60N 2/525* (2013.01);

(Continued)

(58) Field of Classification Search

CPC ........ B60N 2/502; B60N 2/525; B60N 2/505; B60N 2/544; B60N 2/501; B60N 2/508; B60N 2/522; B60N 2/507; B60N 2/509; B60N 2/527; B60N 2/506; B60N 2/4242; B60N 2/24; B60N 2/42736; B60N 2/0232; F16F 15/02; F16F 15/08; F16F 13/26; F16F 13/10; F16F 13/14; F16F 13/08; F16F 15/04; F16F 13/105; F16F 15/022; F16F 13/106; F16F 13/264; F16F 13/18; F16F 13/262; F16F 1/3732; F16F 13/20

(Continued)

(56) References Cited

U.S. PATENT DOCUMENTS

| | | | | |
|---|---|---|---|---|
| 4,993,694 A | | 2/1991 | Gandiglio et al. | |
| 5,348,266 A | * | 9/1994 | Gertel .................. | F16F 13/002 188/378 |

(Continued)

OTHER PUBLICATIONS

International Preliminary Report on Patentability dated Jan. 12, 2016 for International Application No. PCT/US2014/046177 (10 pages).

(Continued)

*Primary Examiner* — Steven Marsh
(74) *Attorney, Agent, or Firm* — Taylor IP, P.C.

(57) ABSTRACT

A gas spring system includes: a gas spring assembly including at least one gas damping passage; a reservoir member connected to the gas spring assembly, the gas spring assembly being in fluid communication with the reservoir member by way of the at least one gas damping passage; and a guide member coupled with the gas spring assembly, the guide member at least partially enclosing the reservoir member and being configured for sliding axially relative to the reservoir member.

20 Claims, 6 Drawing Sheets

Related U.S. Application Data

(60) Provisional application No. 61/845,477, filed on Jul. 12, 2013.

(51) Int. Cl.
*B60N 2/52* (2006.01)
*B62D 33/06* (2006.01)

(52) U.S. Cl.
CPC ............ *B62D 33/0608* (2013.01); *F16F 9/05* (2013.01); *F16F 9/38* (2013.01); *B60G 2202/314* (2013.01); *F16F 2230/0052* (2013.01)

(58) Field of Classification Search
USPC ................................ 248/560, 562, 631, 636
See application file for complete search history.

(56) References Cited

U.S. PATENT DOCUMENTS

| | | | | | |
|---|---|---|---|---|---|
| 5,915,674 | A * | 6/1999 | Wolf | F16F 9/0245 | 188/300 |
| 6,202,972 | B1 | 3/2001 | Manavi | | |
| 6,226,075 | B1 * | 5/2001 | Loopstra | F16C 32/06 | 248/562 |
| 6,485,005 | B1 * | 11/2002 | Tewani | F16F 13/20 | 267/140.13 |
| 6,491,269 | B1 * | 12/2002 | Larson | A47C 3/30 | 248/161 |
| 6,736,380 | B2 * | 5/2004 | Knapp | F16F 9/0272 | 267/131 |
| 7,175,165 | B1 | 2/2007 | Vande Brake et al. | | |
| 7,322,567 | B2 | 1/2008 | Lloyd | | |
| 7,644,943 | B2 | 1/2010 | Hayes et al. | | |
| 7,959,138 | B2 | 6/2011 | Leonard | | |
| 2008/0265475 | A1 | 10/2008 | Keeney et al. | | |
| 2011/0085152 | A1 * | 4/2011 | Nishino | F16F 15/046 | 355/72 |
| 2011/0115140 | A1 | 5/2011 | Moulik et al. | | |

OTHER PUBLICATIONS

Sears Manufacturing Company Product Guide 2007 (16 pages).

* cited by examiner

GAS SPRING SYSTEM

CROSS REFERENCE TO RELATED APPLICATIONS

This is a continuation of PCT application No. PCT/US2014/046177, entitled "GAS SPRING SYSTEM", filed Jul. 10, 2014, which is incorporated herein by reference.

BACKGROUND OF THE INVENTION

1. Field of the Invention

The present invention relates to spring systems, and, more particularly, to gas spring systems.

2. Description of the Related Art

Gas springs can be used, for example, in a vehicle suspension system, to mount a cab of a truck, or to mount seats in a semi-truck or a tractor. In applications using gas springs (which includes air springs), it is necessary to have some way to guide the body (for example, a cab or a seat) being supported by the gas spring, as well as a way to control the dynamic movement of the body. Conventionally, these functions are performed by some sort of linkage that supports the body, the linkage also mounting a gas spring and damper, such as is the case in seating or industrial supports using gas springs. With respect to mounting a seat, a linkage system can be used to help support the seat in conjunction with an air spring, and a hydraulic damper (a shock absorber) can be used to dampen the oscillations of the air spring. Such a linkage, however, can weigh around sixty pounds.

What is needed in the art is a way to support a body in conjunction with a gas spring that is less complex and less expensive to manufacture and to maintain.

SUMMARY OF THE INVENTION

The present invention provides a support with a self-contained gas spring and reservoir.

The invention in one form is directed to a gas spring system including: a gas spring assembly including at least one gas damping passage; a reservoir member connected to the gas spring assembly, the gas spring assembly being in fluid communication with the reservoir member by way of the at least one gas damping passage; and a guide member coupled with the gas spring assembly, the guide member at least partially enclosing the reservoir member and being configured for sliding axially relative to the reservoir member.

The invention in another form is directed to a method of using a gas spring system, the method including the steps of: providing a gas spring assembly, a reservoir member, and a guide member, the gas spring assembly including at least one gas damping passage, the reservoir member being connected to the gas spring assembly, the guide member being coupled with the gas spring assembly and at least partially enclosing the reservoir member; and fluidly communicating the gas spring assembly with the reservoir member by way of the at least one gas damping passage; sliding axially the guide member relative to the reservoir member.

The invention in yet another form is directed to a support system including: a body; a gas spring system supporting the body, the gas spring system including: a gas spring assembly including at least one gas damping passage; a reservoir member connected to the gas spring assembly, the gas spring assembly being in fluid communication with the reservoir member by way of the at least one gas damping passage; and a guide member coupled with the gas spring assembly, the guide member at least partially enclosing the reservoir member and being configured for sliding axially relative to the reservoir member.

An advantage of the present invention is that it reduces the complexity of a support system and its associated weight and cost.

Another advantage is that it replaces a large linkage system with the cylinder design of the present invention.

Yet another advantage is that it avoids the need of using a hydraulic damper.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
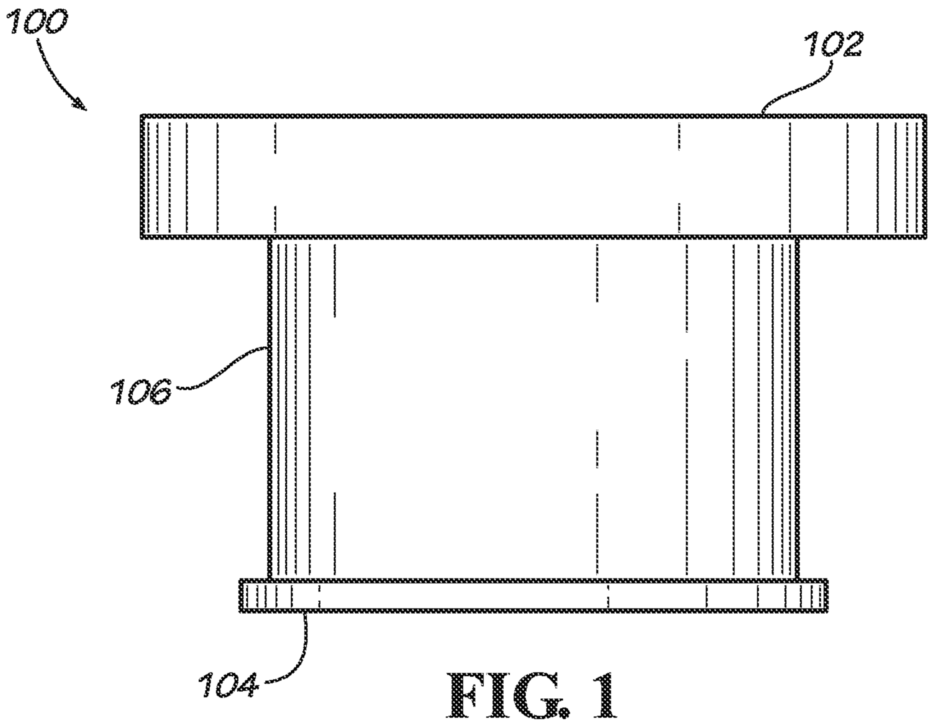
FIG. 1 is a schematic view of a support system according to the present invention.

Referring now to the drawings, and more particularly to FIG. 1, there is shown a support system 100 which generally includes a body 102, a mount 104, and a gas spring system 106 which supports body 102 on mount 104. Body 102 can be a frame or chassis of a vehicle, a cab of a vehicle such as a truck, or a seat of a semi-truck or tractor; these bodies 102 are provided merely by way of example and not by way of limitation. The gas spring system 106 supports body 102 on another surface 104. That is, gas spring system 106 can be used to support body 102 on another surface 104 (which can be referred to as mount 104). For instance, regarding a vehicular suspension system, body 102 can be a chassis and the other surface 104 can be an axle of that vehicle. Similarly, regarding body 102 formed as a cab, gas spring system 106 can support cab 102 on a vehicle chassis 104.

Further, regarding a body 102 formed as a seat, gas spring system 106 can support a seat 102 on a floor 104 of a cab or, alternatively, on a mount 104 attached to the floor of the cab.

Figure 2:
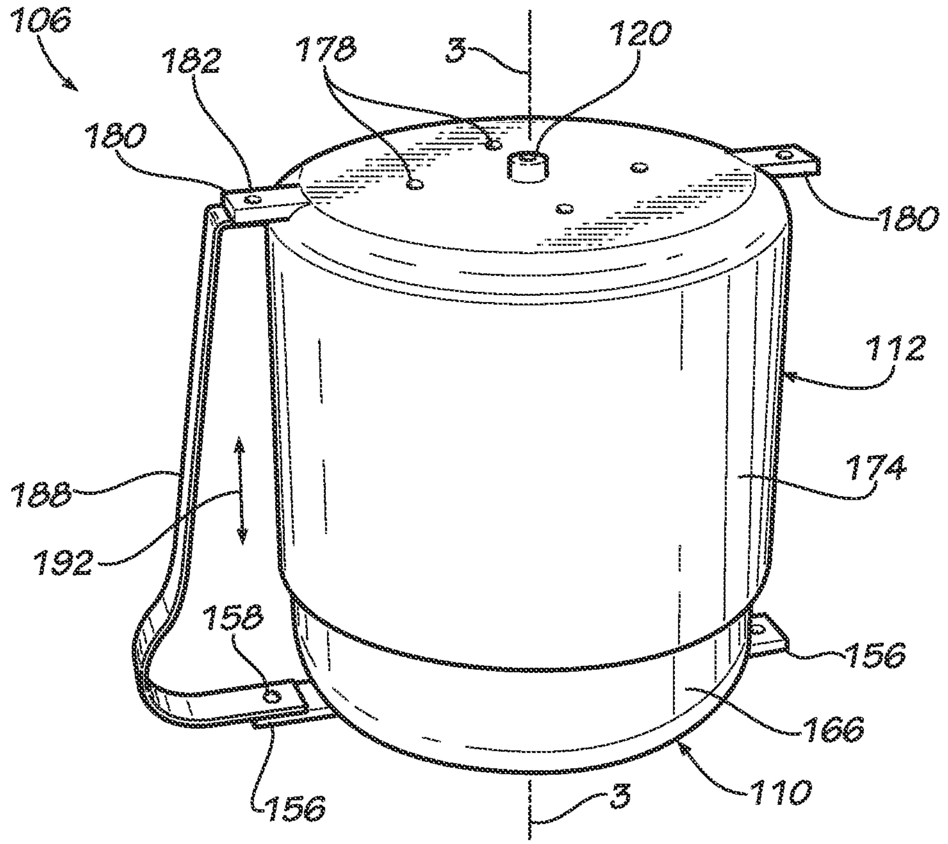
FIG. 2 is a perspective view of a gas spring system of FIG. 1.
Figure 3:
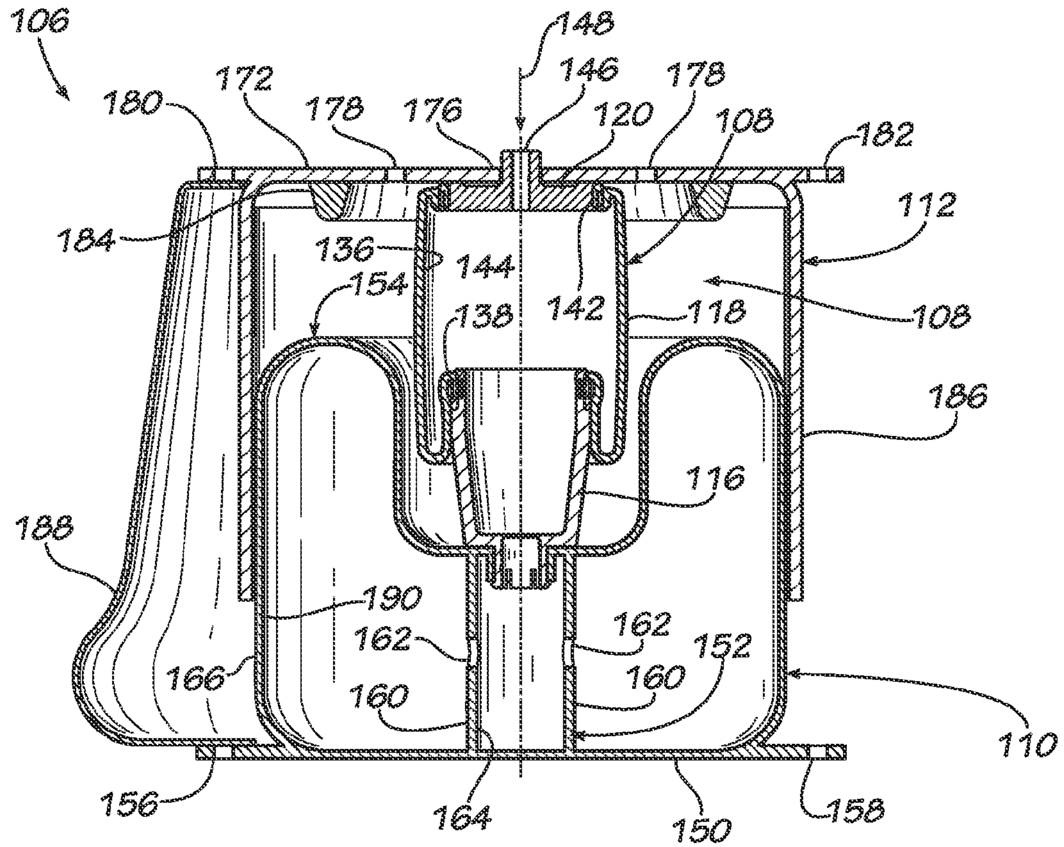
FIG. 3 is a sectional view of the gas spring system of FIG. 2 taken in a top dead center location of the gas spring system on a vertical plane substantially along line 3-3 in FIG. 2.
Figure 4:
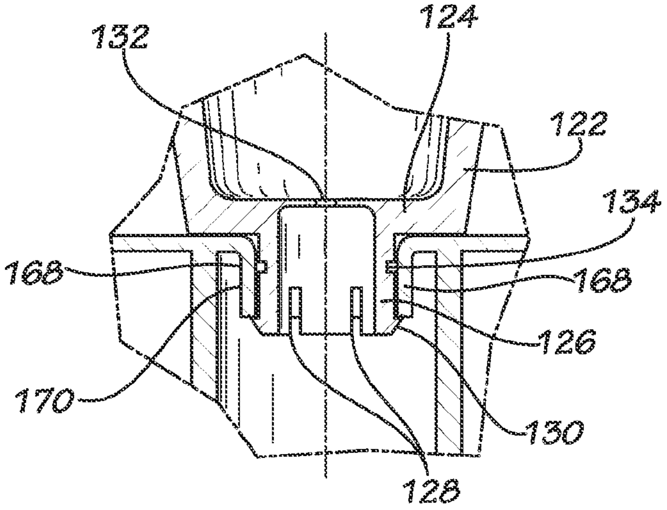
FIG. 4 is a sectional view of the gas spring system of FIG. 3, with portions broken away.
Figure 6:
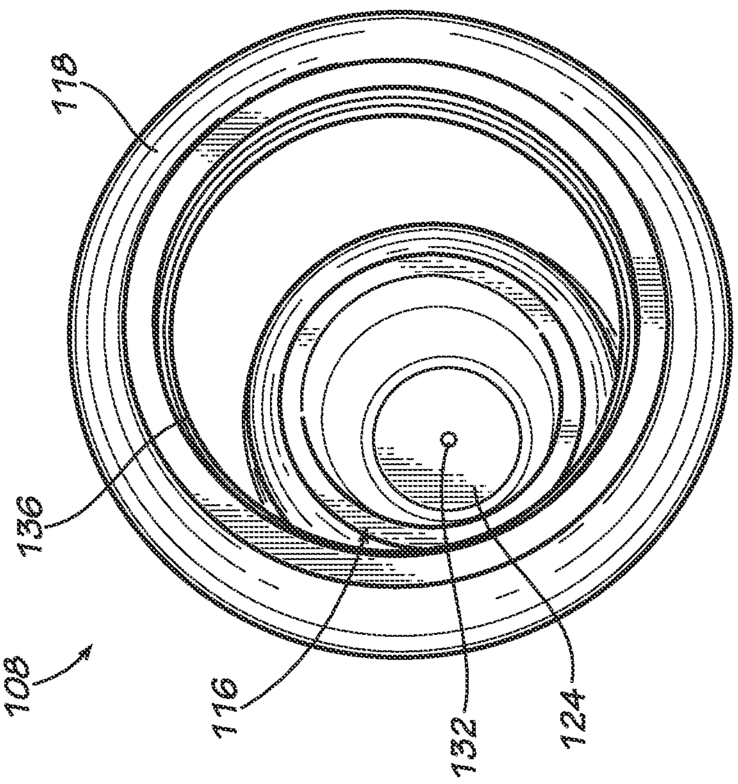
FIG. 6 is a perspective view of the gas spring assembly of FIG. 5, with portions broken away.
Figure 5:
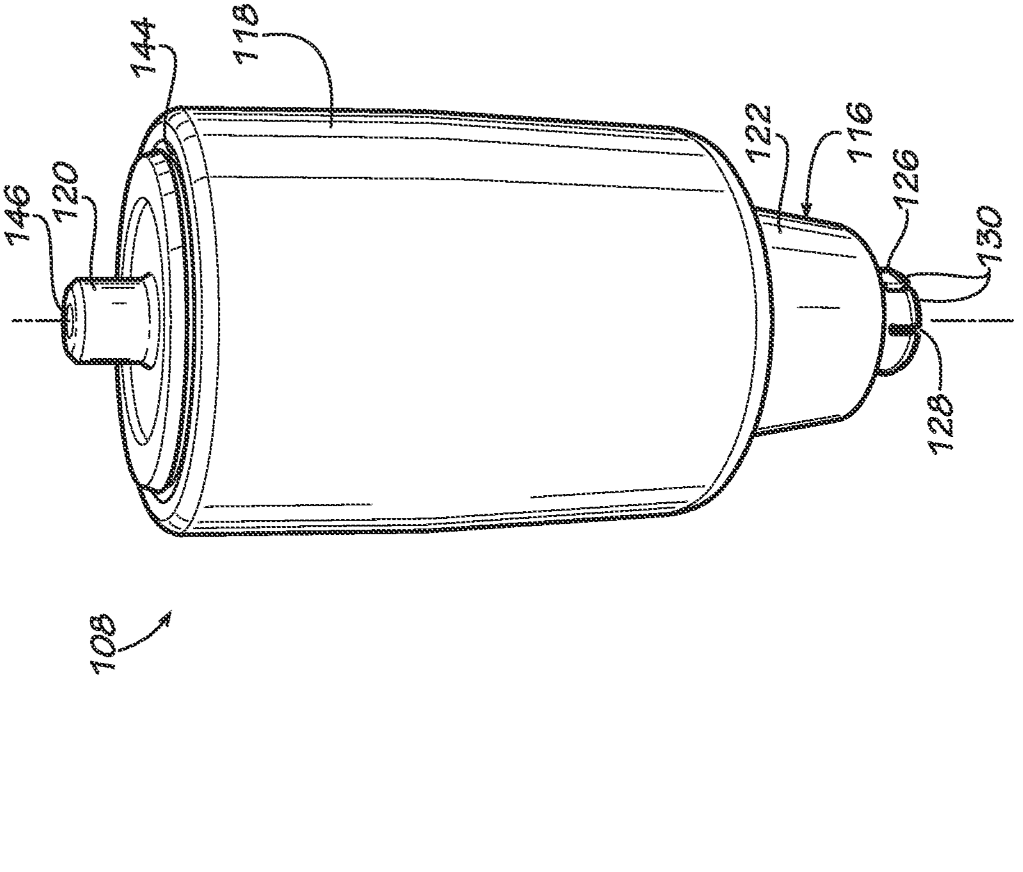
FIG. 5 is a perspective view of the gas spring assembly of the gas spring system of FIG. 2.

FIGS. 2 and 3 show that gas spring system 106 includes a gas spring assembly 108, a reservoir member 110, and a guide member 112 and can be a substantially cylindrical structure. FIGS. 3-10 show, in one embodiment of the present invention, gas spring system 106, or components thereof, in greater detail. A longitudinal axis of gas spring system 106 is shown in FIG. 5. Stated another way, the present invention provides a support (which is generally referred to herein as gas spring system 106) with a self-contained gas spring (which is generally referred to herein as gas spring assembly 108) and a reservoir member 110. As shown in FIG. 2, gas spring system 106 generally appears as a telescoping cylinder. Thus, the present invention, according to one embodiment of the present invention, provides support system 100 which includes body 102 and gas spring system 106 supporting body 102. According to one embodiment of the present invention, gas spring system 106 includes a gas spring assembly 108 including at least one gas damping passage (for example, but not limited to, orifice 132 shown in FIG. 4); reservoir member 110 connected to gas spring assembly 108, gas spring assembly 108 being in fluid communication with reservoir member 110 by way of the at least one gas damping passage (for example, but not limited to, orifice 132); and guide member 112 coupled with gas spring assembly 108, guide member 112 at least partially enclosing reservoir member 110 and being configured for sliding axially relative to reservoir member 110. It is understood that the figures show merely one embodiment of the present invention.

Gas spring assembly 108 can be formed as a rolling lobe type of air spring, but other types of air springs can be used. Gas spring assembly 108, in one embodiment of the present invention, includes a gas spring piston 116, a flexible wall 118 connected to gas spring piston 116, and a cap 120 (which can also have a mounting fitting). Both gas spring piston 116 and cap 120, however, can be generally referred to as end members of the gas spring assembly 108. The term "end member" thus includes, and can thus refer to either of, a gas spring piston and a cap. According to an alternative embodiment of the present invention, the gas spring assembly 108 of the present invention can, for example, include two end members, each end member being two caps (no piston). The gas spring assembly of the present invention is not limited to one which has a cap and a gas spring piston but can include other combinations of such end members. Thus, gas spring assembly 108 includes two end members (such as, but not limited to, gas spring piston 116 and cap 120) and a flexible wall 118 which is attached to the end members and is positioned therebetween.

Further, at least one of the end members of the gas spring assembly of the present invention includes the at least one gas damping passage. This at least one gas damping passage, as described below and shown in the figures, can be (according to one embodiment of the present invention) orifice 132 formed in gas spring piston 116. However, the at least one gas damping passage of the present invention is not limited to being orifice 132 on gas spring piston 116. Thus, for example, the orifice 132 (forming the at least one gas damping passage) can be provided on cap 120. That is, for example, gas spring assembly 108 could be inverted (from what is shown in the figures), and orifice 132 could be formed on cap 120, rather than on gas spring piston 116. Further, while an orifice does provide damping, the at least one gas damping passage of the present invention is not limited to being an orifice. That is, the present invention provides that the at least one gas damping passage can be, for example, an orifice, but the at least one gas damping passage is not limited to this embodiment. The at least one gas damping passage can be provided by something other than an orifice. For example, other structure can be used to provide damping, such as, but not necessarily limited to, valves and pipes. Further, by way of example (and not by way of limitation), the at least one gas damping passage of the present invention can be a plurality of orifices. Alternatively, by way of example (and not by way of limitation), orifice/valve combinations (that is, a combination of at least one orifice and at least one valve) can provide one or more gas damping passages according to the present invention. With this in mind, a description of one embodiment of the gas spring assembly according to the present invention, as shown in the figures, follows.

Figure 7:
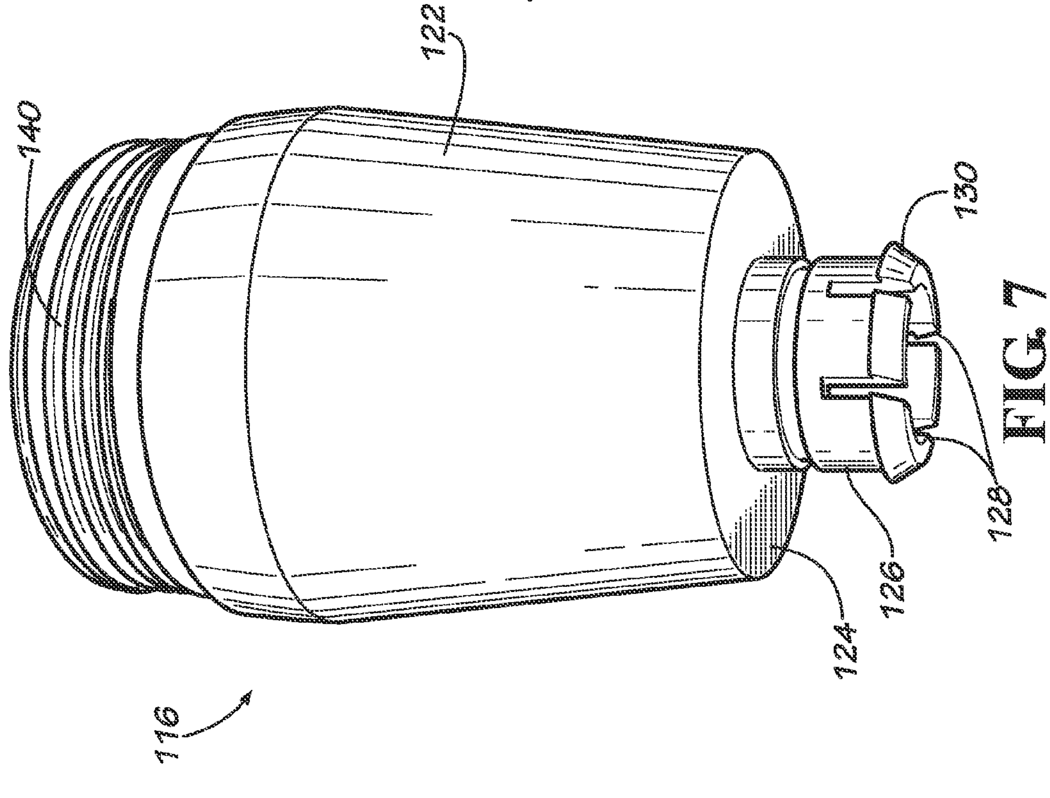
FIG. 7 is a perspective view of the piston of the gas spring assembly of FIG. 5.

Gas spring piston 116 includes a first wall 122, a base 124 connected to a bottom end of first wall 122, and a second wall 126 connected to base 124. First wall 122 can generally form a cup-like structure, first wall 122 having generally a circular cross-section; the area of this cross-section can reduce continuously and/or in a step-wise manner, as indicated in FIG. 7. At an upper end of first wall 122, first wall 122 can include a plurality of ridges 140. Second wall 126 has a reduced cross-section relative to first wall 122 and can have a plurality of slits 128 to allow for the flexing of second wall 126. Around the bottom edge of second wall 126 can be a snap tab 130 (which can be viewed as a plurality of snap tabs 130 in light of slits 128). Base 124 includes a reduced thickness portion. This reduced thickness portion includes an orifice 132 which forms a passageway from a well formed by first wall 122 to a well formed by second wall 126. Second wall 126 includes an annular groove 134 (which can be referred to as a seal channel 134) for receiving a seal therein (such as, for example, an O-ring seal, although other types of seals can be used), this seal not being shown in the figures. Gas spring assembly 108 is in fluid communication with reservoir member 110 by way of orifice 132. By way of example and not by way of limitation, piston 116 can be made of glass-reinforced nylon and can be formed by a molding operation. Alternatively, piston 116 can be formed by stamping, punching, machining, welding, and/or any other suitable method.

Flexible wall 118 of gas spring assembly 108 forms a bellows that defines an internal chamber 136 which can receive a gas, such as (but not limited to) air. Depending upon the volume of gas within internal chamber 136 of flexible wall 118, flexible wall 118 can vary from a collapsed condition (having a minimum volume of internal chamber 136) to an extended position (having a maximum volume of internal chamber 136). In this respect, the volume of internal chamber 136 will define the volume of the bellows, which can also be referred to as an air spring. By way of example and not by way of limitation, flexible wall 118 can be made of rubber reinforced with a fabric and can be made in any suitable manner. A lower portion of flexible wall 118 can be attached to the upper end of piston 116. More specifically, a band 138 can be used to crimp the lower portion of flexible wall 118 to the plurality of ridges 140 (which can also be referred to as threads) of piston 116. By way of example and not by way of limitation, band 138 can be made of steel or aluminum and can be formed in any suitable manner. Band 138 can be a continuous ring. Band 138 can be placed over (radially outwardly of) the bottom of flexible wall 118, the top of piston 116 can then be placed radially inside of band 138 and a portion of flexible wall 118 (this portion of flexible wall 118 being between band 138 and piston 116), and then band 138 can be squeezed (crimped) down onto flexible wall 118 and piston 116, thereby crimping (and thus securing) flexible wall 118 between band 138 and piston 116.

Cap 120 includes a plurality of ridges 142 around its circumference. An upper end of flexible wall 118 can be attached (such as by way of crimping using a band 144) to a plurality of ridges 142 (which can also be referred to as threads) of cap 120. Cap 120 includes a through-hole 146 by which a gas (such as air) can flow in the direction of arrow 148 from a gas source (not shown) into interior chamber 136 of air spring flexible wall 118 by way of a gas line (not shown). Cap 120 is attached to guide member 112. Cap 120 can be a hollow or a solid body and can include, for example, four open pockets facing interior chamber 136 of flexible wall 118. By way of example and not by way of limitation, cap can be made of a glass-reinforced nylon and can be formed by a molding operation. Threads 142 can be formed during the molding operation. The upwardly projecting neck (which can be referred to as a stud) of cap 120 which is positioned through hole 176 of guide member 112 can also include a plurality of threads molded to the exterior thereof (these threads are not shown in the figures); these threads can threadably receive a nut (not shown in the figures) which can be tightened so as to secure cap 120 to guide member 112. Further, cap 120 can include additional external or internal threads or other features to secure a gas line (such as a line for pressurized air) thereto. By way of example and not by way of limitation, band 144 can be made of steel or aluminum and can be formed in any suitable manner. Band 144 can be a continuous ring. Band 144 can be placed over (radially outwardly of) the top of flexible wall 118, cap 120 can then be placed down over band 144 (at least a portion of cap 120 being radially inwardly of flexible wall 118), and then band 144 can be squeezed (crimped) down onto flexible wall 118 and cap 120, thereby crimping (and thus securing) flexible wall 118 between band 144 and cap 120.

Figure 8:
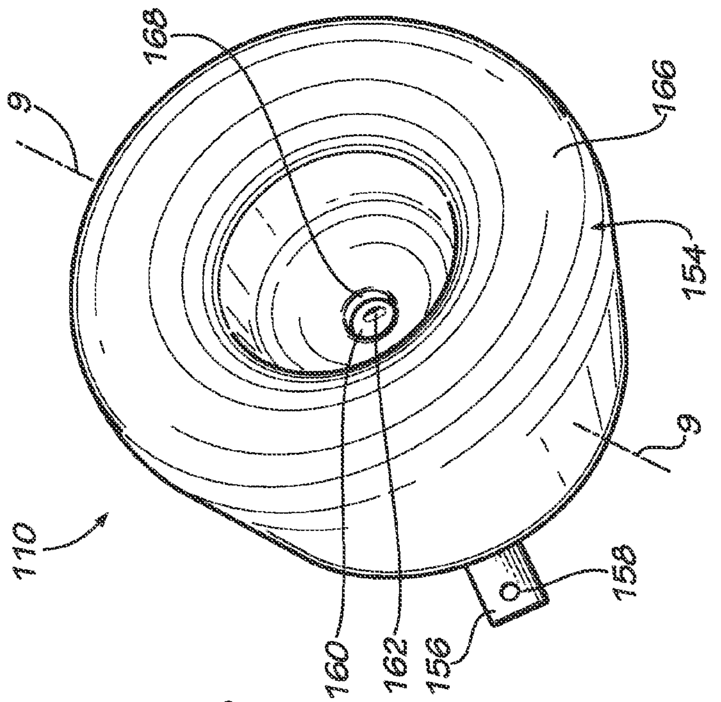
FIG. 8 is a perspective view of the reservoir member of the gas spring system of FIG. 2.
Figure 9:
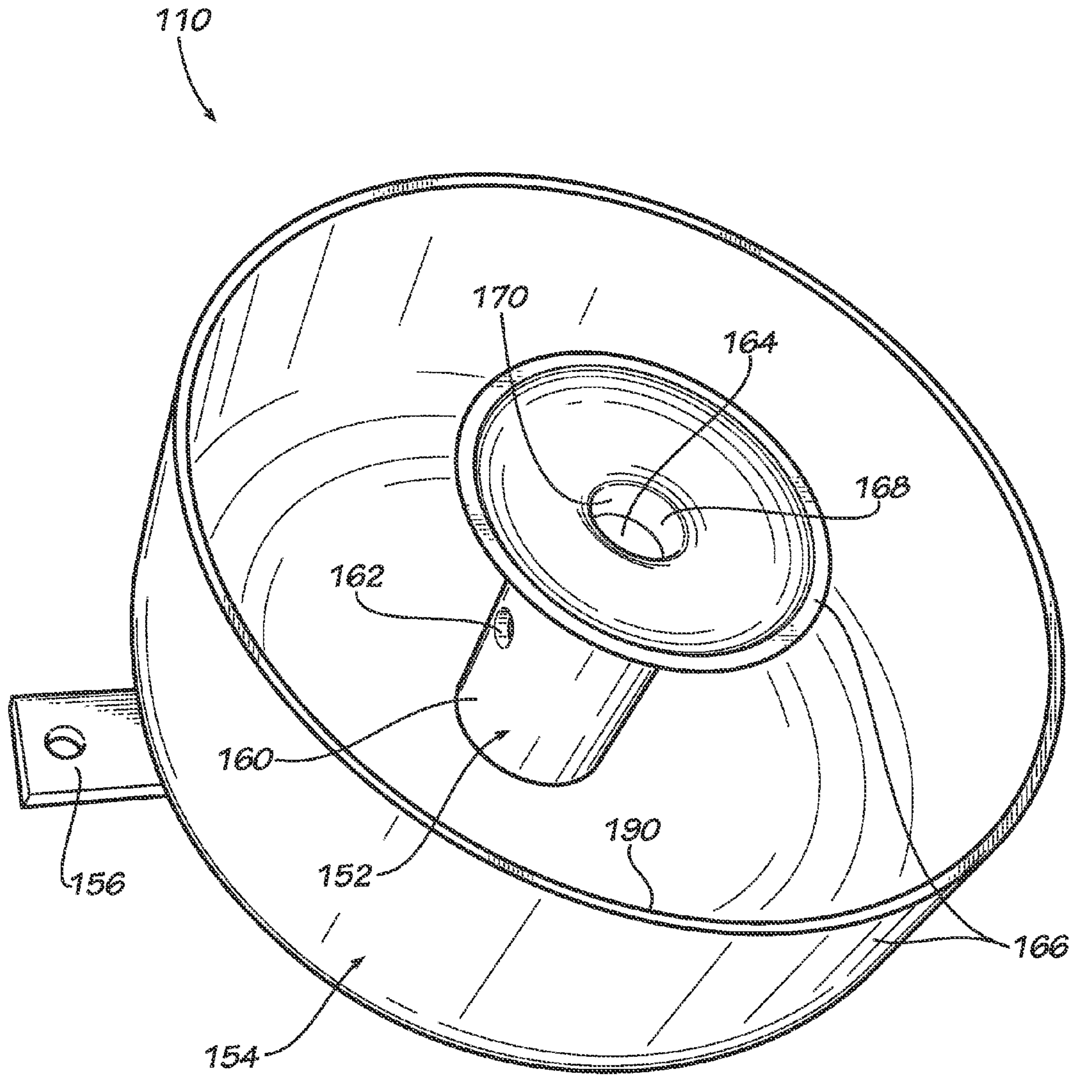
FIG. 9 is a sectional, perspective view of the reservoir member of FIG. 8 taken on a horizontal plane substantially along line 9-9 in FIG. 8.

Reservoir member 110 is connected to gas spring piston 116. Reservoir member 110 is a substantially rigid structure. By way of example and not by way of limitation, reservoir member 110 can be made of steel, aluminum, or a composite. FIGS. 2, 3, 8, and 9 show that reservoir member 110 can include a base 150, an inner chamber section 152, and an outer chamber section 154. Base 150 forms the bottom of reservoir 110. Base 150 can include mounting tabs 156 which can be formed integral with base, or tabs 156 can be attached to base 150, such as by welding. Base 150 and/or tabs 156 can be formed by stamping, for example. Each tab 156 can include a mounting hole 158 (which can be stamped or punched, for example) to mount base 150 to the bottom structure 104 mentioned above (for example, the floor or other mounting structure of a cab of a truck). Inner chamber section 152 includes a cylindrical wall 160 standing up from base 150. Cylindrical wall 160 of inner chamber section 152 can include two vent holes 162 (which can be stamped or punched, for example) opposing one another, as shown in FIGS. 3, 8, and 9. Cylindrical wall 160 defines an inner chamber 164 of reservoir member 110. Outer chamber section 154 includes an annular wall 166 standing up from base 150 (annular wall 166 is a substantially rigid structure). Annular wall 166 member proceeds substantially vertically (axially) from base 150, then curves radially inwardly, then proceeds axially back towards base 150, and then proceeds radially inwardly across the top of cylindrical wall 160. Annular wall 166 and wall 160 define an outer chamber 190 of outer chamber section 154. Vent holes 162 can permit the transmission of gas between inner chamber 164 and outer chamber 190 of reservoir member 112. At the radially inner end of annular wall 166 is a flange 168 descending downwardly from annular wall 166 and having a generally circular cross-section. Flange 168 forms an extruded hole 170. FIGS. 3 and 4 show the connection between gas spring piston 116 and flange 168. The snap tabs 130 of second wall 126 of gas spring piston 116 are inserted into hole 170 defined by flange 168, snap tabs 130 resiliently flexing inwardly during insertion until snap tabs 130 are free of flange 168 and positioned in the inner chamber 164 of reservoir member 110. The seal positioned in seal groove 134 serves to prevent leakage between gas spring interior chamber 136 and inner chamber 164, the flow between these chambers 136 and 164 occurring by way of orifice 132. Cylindrical wall 160, annular wall 166, and flange 168 can be individually stamped and folded or bent and then welded to one another and/or base 150 to form the structure of reservoir 110. For instance, cylindrical wall 160 can be formed as a tube and then welded to a flat plate forming base 150. For example, and not by way of limitation, a sheet metal stamping process can be used to form an elongated hole (a cylindrical hole), thereby forming extruded hole 170; that is, during such a process, a hole can be pierced in a material (such as sheet metal), and the metal can be pushed or pulled downward to make a cylindrical passage forming an extruded hole, such as extruded hole 170.

Guide member 112 is coupled with gas spring assembly 108 (for example, as described above relative to threading a nut onto cap 120). Guide member 112 can also be called a guide housing 112. Guide member 112 includes a base 172 and an outer wall 174 depending downwardly from base 172. Base 172 of guide member 112 includes a central hole 176 through which cap 120 extends. Base 172 further includes a plurality of vent holes 178. Further, base 172 can include mounting tabs 180 which can be formed integral with base 172, or tabs 180 can be attached to base 172, such as by welding. Base 172 and/or tabs 180 can be formed by stamping. Each tab 180 can include a mounting hole 182 to mount base 172 to the supported body 102 mentioned above (for example, a seat). Outer wall 174 is substantially cylindrical. Guide member 112 can further include an annular bumper 184 mounted to an interior surface of base 172. Bumper 184 serves as a pad which contacts the upper portion of annular wall 166 when reservoir member 110 and guide member 112 contract relative to one another, bumper 184 preventing annular wall 166 from contacting base 172 of guide member 112 and providing a cushion between annular wall 166 and base 172. By way of example and not by way of limitation, bumper 184 can be made of rubber or foam and can be made in any suitable manner, such as by way of molding. Further, bumper 184 can be directly bonded to base 172 (such as by way of an adhesive or by curing bumper 184 onto a metal, such as onto a metallic base 172) or can be attached to base 172 or outer wall 174 by way of one or more fasteners.

Figure 10:
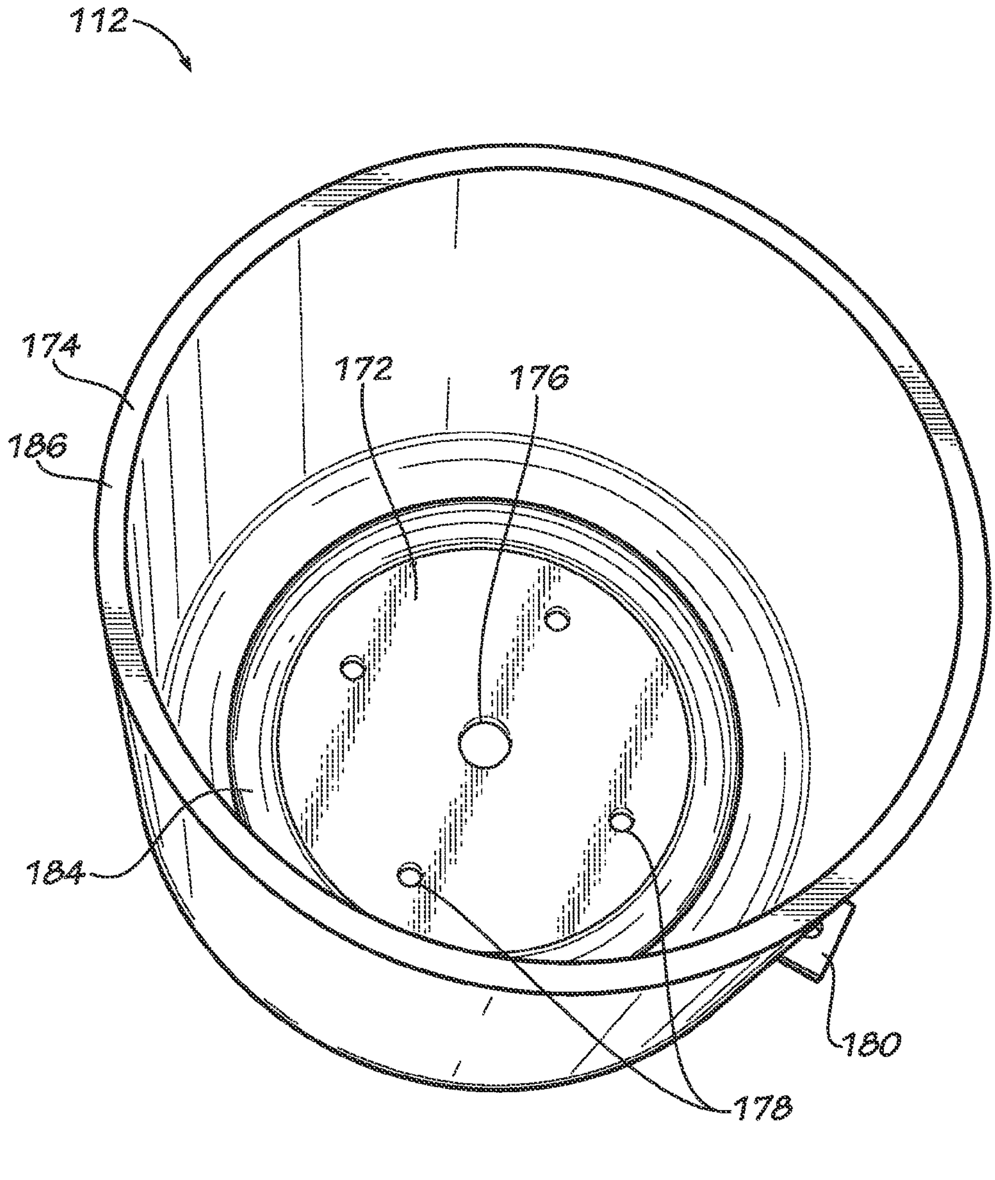
FIG. 10 is a perspective view of the guide member of the gas spring system of FIG. 2.

According to one embodiment of the present invention, guide member 112 can further include a bearing 186 attached to the inner surface of outer wall 174. Bearing 186 facilitates the sliding of outer wall 174 in a telescopic relationship with annular wall 166 of reservoir member 110, annular wall 166 being the inner member of the telescopic relationship. Bearing 186 can cover, as shown in FIGS. 3 and 10, substantially all of the inner surface of outer wall 174 and can thus be formed as a sleeve (which may be referred to as a layer, a bushing, or a bushing sleeve) on the inner surface of outer wall 174. In this form, by way of example and not by way of limitation, bearing 186 can be made of polytetrafluoroethylene (TEFLON®) or UHMW (ultra-high-molecular-weight) polyethylene and can be formed in any suitable manner. Bearing 186 can be bonded (such as by curing) or adhered to the inner surface of outer wall 174. Alternatively, bearing 186 can be press fit into the cylinder formed by outer wall 174 and thus fit snugly radially within the inner surface of outer wall 174.

In another form, the bearing of the present invention can be formed as one or more bearing assemblies with a plurality of tracks and a plurality of ball or roller bearings therebetween. For instance, one bearing assembly can include a linear track mounted in the axial direction (see double-arrow 192, the axial direction being considered to be substantially vertical) to the inside surface of outer wall 174, another linear track mounted in the axial direction on the vertical section of the outer surface of annular wall 166, and a plurality of ball or roller bearings positioned between these tracks so as to be able to run thereon. These tracks can be bolted to the corresponding walls 174, 166. A plurality of these bearing assemblies (for example, three or four such bearing assemblies) can be bolted vertically around the inside surface of outer wall 174 and thus also vertically around the outer surface of the vertical section of annular wall 166. These ball bearing assemblies can be made of any suitable material or materials.

As shown in FIGS. 2 and 3, guide member 112 at least partially encloses reservoir member 110 and, as shown by double-arrow 192, is configured for sliding axially relative to reservoir member 110. Base 172 and outer wall 174 can be individually formed by stamping, punching, machining, or any other suitable method and can be joined together by welding for example, or base 172 and outer wall 174 can be formed integral without the need for welding. Further, by way of annular wall 166 and outer wall 174, reservoir 110 and guide member 112 provide lateral loading stability, as well as fore and aft loading stability. By way of example and not by way of limitation, base 172, tabs 180, and outer wall 174 of guide member 112 can be made of steel, aluminum, or a composite and can be substantially rigid.

Gas spring system 106 can further include a strap 188, as shown in FIGS. 2 and 3. Strap 188 can be made of, for example, nylon, and be like a seat belt. Strap 188 serves as an extension limiter. Stated another way, strap 188 limits the distance from which each of bases 150, 172 can be spaced apart from one another. In this way, guide member 112 does not slide off of reservoir member 110; more specifically, strap 188 prevents outer wall 174 from sliding off of the top of annular wall 166. Alternatively, positive stops can be incorporated into the roller track guide bearings (mentioned above) to provide the same function as extension limiter strap 188.

In summary, the present invention involves a reservoir member 110 that is in fluid communication with at least one gas spring 108. The reservoir 110 and gas spring 108 sizes are proportioned to provide the proper load and dynamic responses in conjunction with at least one orifice passage 132. One method of connecting a gas spring 108 directly to a reservoir 110 can include having an extruded hole 170 in the reservoir 110 and a gas spring feature having snap tabs 130 and an O-ring; a similar connection between different parts is disclosed in U.S. Pat. No. 7,959,138 B2. The gas spring 108 is directly mounted to the reservoir 110 and transmits loads through it. Therefore, the reservoir member 110 can have support structures as needed. If an additional reservoir volume is necessary, the reservoir chamber (defined by outer chamber section 154) can extend around and can envelop at least a portion of the at least one gas spring 108. The reservoir member 110 has a mounting surface opposite the gas spring 108 with suitable mounting features such as studs, blind nuts, or mounting tabs. Depending upon the type of guide bearing 186 used, the reservoir member 110 may have a guide bearing feature (such as a track for ball bearings) which allows axial displacement with a complementary guide bearing feature 186 of a guide housing 112, if bearing 186 is formed as a ball or roller bearing assembly. Alternatively, the guide bearing 186 can include at least one low-friction polymer, at least one oil-impregnated metal, roller bearings, or the like. The guide housing 112 maintains alignment with the reservoir member 110 but provides axial displacement while mounting to an end of the gas spring 108 opposite the reservoir member 110. The guide housing 112 (which can be called a guide member 112) has a mounting surface opposite the gas spring 108 with suitable mounting features such as studs, blind nuts, or mounting tabs. To limit jounce travel, an optional bump stop (for example, bumper 184) can be provided between the guide housing 112 (more specifically, base 172 of guide housing 112) and reservoir member 110. Similarly, to limit rebound travel, an extension limiter such as a strap 188 can be provided therebetween (that is, between guide housing 112 and reservoir member 110). If the guide housing 112 substantially envelops the reservoir member 110, optional vent holes 178 can be provided therein (such as vent holes 178 (four being shown in FIG. 2) in base 172 of guide housing 112) to prevent unnecessary pressure differentials. Further, any of the substantially rigid portions of gas spring system 106 can be formed by stamping (such as stamping sheet metal), punching, forming, bending, machining, molding, and fastening and/or welding individually formed parts together.

During assembly, bands 138 and 144 can be used to crimp flexible wall 118 respectively to piston 116 and cap 120. Cap 120 can be attached to base 172 by way of a nut threadably secured to the threaded neck or stud of cap 120, as described above. Second wall 126 of piston 116 can be inserted into hole 170 until snap tabs 130 snap outside of flange 168 to thereby attach piston 116 to reservoir member 110 (the seal already having been seated in seal groove 134). Outer wall 174 can be slid over the outer radial circumference of annular wall 166. Until pressurized air is inserted into air spring assembly 108, bumper 184 can rest on top of annular wall 166. Mounting 104 can be secured to reservoir 110 by way of mounting holes 158. Body 102 can be secured to guide member 112 by way of mounting holes 182. Strap 188 can be secured to bases 150, 172 (or tabs 156, 180) by way of mounting holes 158 and 182; that is, the same way of fastening gas spring system 106 to body 102 (such as a seat) and to a floor (or other mount 104) by way of mounting holes 158 and 182 can be used also to secure strap 188 to tabs 156, 180. The individual components of gas spring system 106 can be formed as solid or hollow bodies. According to one embodiment (this being provided by way of example and not by way of limitation), reservoir member 110 can be made of steel, and guide member 112 (in particular, base 172, tabs 180, and/or outer wall 174) can be made of aluminum.

In use, gas spring system 106 can be used in an exemplary application of an air-ride seat, such as for a heavy semi-truck; this is provided merely by way of example and not by way of limitation. Gas spring system 106 can use, for example, pressurized air as the gas. Air spring system 106 can maintain the same height (distance between body 102 and mount 104) for various loads. More air pressure can be added (such as by way of hole 146 of fitting 120) to get the height of 102 that is desired. Guide member 112 can slide relative to reservoir member 110, as indicated by double-arrow 192. Air spring system 106 is advantageously tunable with regard to the spring rate (for example, if a larger air volume is available, then an air spring can be "softer", which can be accomplished by attaching a larger air reservoir tank to an air spring). Damping occurs by way of orifice 132 between the air spring volume of gas spring assembly 108 and the reservoir volume of reservoir member 110. The motion of air spring assembly 108 (that is, the extension and compression of air spring assembly 108, which is associated with the extension and contraction of gas spring system 106 as seen by base 172 moving closer to or farther from base 150) causes air to move in and out of reservoir member 110 by way of orifice 132. In general, when a mass is suspended, the mass can resonate at a certain frequency, and a damper performance can be tuned to this frequency (to avoid or minimize oscillations). In the present invention, gas spring system 106 can be tuned to the best damping performance relative to the resonation frequency relative to the size of the volumes (that is, the ratio of the volumes associated with gas spring assembly 108 and reservoir member 110) and the orifice 132. Thus, air is forced in and out of reservoir member 110 by way of orifice 132 as gas spring assembly 108 cycles up and down, a damping effect occurring by way of orifice 132 as air goes through orifice 132.

The present invention further provides a method of using a gas spring system 106, the method including the steps of: providing a gas spring assembly 108, a reservoir member 110, and a guide member 112, gas spring assembly 108 including at least one gas damping passage 132, reservoir member 110 being connected to gas spring assembly 108, guide member 112 being coupled with gas spring assembly 108 and at least partially enclosing reservoir member 110; and fluidly communicating gas spring assembly 108 with reservoir member 110 by way of at least one gas damping passage 132; sliding axially guide member 112 relative to reservoir member 110. As previously described, the body 104 that can be supported by the gas spring system 106 can have a resonation frequency when suspended by the gas spring system 106. This resonation frequency can be measured by a frequency meter (not shown) and the ratio of the reservoir volume to the air spring volume can be adjusted in response to the measured resonation frequency to provide improved damping. Further, the passage size of the at least one gas damping passage, such as orifice 132, can be adjusted in response to the measured resonation frequency, either alone or in conjunction with adjusting the ratio of the reservoir volume to the air spring volume, to provide improved damping. The adjustment of the ratio of the reservoir volume to the air spring volume and the passage size can be performed before installing the gas spring system 106, using a simulated resonation frequency of body 104, or can be performed when the body 104 and gas spring system 106 are installed in, for example, a vehicle. Ways to adjust the ratio of the reservoir volume to the air spring volume can include, for example, changing the size of the reservoir member 110, changing the size of the gas spring 108 and changing the amount of gas in the internal chamber 136. Similarly, the passage size can be adjusted by increasing or decreasing the passage size; changing the degree of blockage (what percentage of the passage is unblocked) of the at least one gas damping passage; or blocking one or more gas damping passages if there are multiple gas damping passages used. These adjustments are given only as examples and not meant to limit the scope of adjustments that can be made. The adjustments can be performed manually by a user or can be performed using an automated controller.

The present invention further provides a method of using a support system 100, the method including the steps of: providing a body 102 and a gas spring system 106 supporting body 102, gas spring system 106 including a gas spring assembly 108, a reservoir member 110, and a guide member 112, gas spring assembly 108 including at least one gas damping passage 132, reservoir member 110 being connected to gas spring assembly 108, guide member 112 being coupled with gas spring assembly 108 and at least partially enclosing reservoir member 110; fluidly communicating gas spring assembly 108 with reservoir member 110 by way of at least one gas damping passage 132; sliding axially guide member 112 relative to reservoir member 110.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A gas spring system, comprising:

a gas spring assembly including a flexible wall forming a bellows defining an internal chamber and at least one gas damping passage;

a substantially rigid reservoir member connected to said gas spring assembly, said internal chamber being in fluid communication with said reservoir member by way of said at least one gas damping passage; and a guide member coupled with said gas spring assembly, said guide member at least partially enclosing said reservoir member and being configured for sliding axially relative to said reservoir member.

2. The gas spring system according to claim 1, wherein said internal chamber defines a gas spring volume, said reservoir member defines a reservoir volume and a ratio is defined between said reservoir volume and said gas spring volume.

3. The gas spring system according to claim 2, wherein said ratio is configured to provide a damping effect.

4. The gas spring system according to claim 2, wherein said at least one gas damping passage has a passage size, said passage size being configured to provide a damping effect in conjunction with said ratio.

5. The gas spring system according to claim 1, wherein said reservoir member includes an inner wall enclosing an inner chamber, said inner chamber being in fluid communication with said internal chamber by way of said at least one gas damping passage.

6. The gas spring system according to claim 5, wherein said inner wall includes at least one vent hole formed through.

7. The gas spring system according to claim 1, further including a guide bearing separating said reservoir member and said guide member.

8. The gas spring system according to claim 1, further including an extension limiter connected to said guide member and said reservoir member.

9. The gas spring system according to claim 1, further including a bumper provided between said guide member and said reservoir member.

10. A method of using a gas spring system, said method comprising the steps of:

providing a gas spring assembly, a substantially rigid reservoir member, and a guide member, said gas spring assembly including a flexible wall forming a bellows defining an internal chamber and at least one gas damping passage, said reservoir member being connected to said gas spring assembly, said guide member being coupled with said gas spring assembly and at least partially enclosing said reservoir member;

fluidly communicating said internal chamber with said reservoir member by way of said at least one gas damping passage; and sliding axially said guide member relative to said reservoir member.

11. The method according to claim 10, wherein said at least one gas damping passage defines a passage size, said internal chamber defines a gas spring volume, said reservoir member defines a reservoir volume and a ratio is defined between said reservoir volume and said gas spring volume.

12. The method according to claim 11, further including the step of adjusting at least one of said passage size and said ratio.

13. The method according to claim 12, further including the step of identifying a resonation frequency of a body supported by said gas spring assembly.

14. The method according to claim 13, wherein said adjusting step is performed responsively to said identified resonation frequency.

15. The method according to claim 14, wherein said adjusting step provides a damping effect.

16. The method according to claim 10, wherein said gas spring assembly supports a body.

17. A support system, comprising:

a body;

a gas spring system supporting said body, said gas spring system including:

a gas spring assembly including a flexible wall forming a bellows defining an internal chamber and at least one gas damping passage;

a substantially rigid reservoir member connected to said gas spring assembly, said internal chamber being in fluid communication with said reservoir member by way of said at least one gas damping passage; and a guide member coupled with said gas spring assembly, said guide member at least partially enclosing said reservoir member and being configured for sliding axially relative to said reservoir member.

18. The support system according to claim 17, wherein said body is at least one of a vehicle frame, a vehicle chassis, a vehicle cab, and a vehicle seat.

19. The support system according to claim 18, wherein said body is configured to be a part of a semi-truck.

20. The gas spring system according to claim 1, wherein said reservoir member includes a base and a wall standing up from said base, said guide member being configured to axially slide along said wall.

* * * * *